| United States Patent [19] | [11] Patent Number: 4,735,378 |
|---|---|
| Kagano et al. | [45] Date of Patent: Apr. 5, 1988 |

[54] TAPE CARTRIDGE WITH AN ARRANGEMENT OF A MAGNETIC SHIELDING PLATE

[75] Inventors: Shinichi Kagano, Kyoto; Kazuaki Urano, Osaka, both of Japan

[73] Assignee: Hitachi Maxell, Ltd., Osaka, Japan

[21] Appl. No.: 903,504

[22] Filed: Sep. 4, 1986

[30] Foreign Application Priority Data

Sep. 4, 1985 [JP] Japan ................... 60-195175

[51] Int. Cl.$^4$ ................ G11B 15/32; G11B 23/06
[52] U.S. Cl. .................... 242/197; 360/132; 242/199
[58] Field of Search ........... 242/197, 198, 199, 200; 360/96.1, 132; 361/212, 221

[56] References Cited

U.S. PATENT DOCUMENTS

| 4,022,402 | 5/1977 | Morimoto | 242/199 |
| 4,191,984 | 3/1980 | Tsukidate | 242/199 X |
| 4,290,567 | 9/1981 | Saito | 242/199 X |
| 4,452,408 | 6/1984 | Sasaki | 242/197 X |
| 4,506,846 | 3/1985 | Gelardi et al. | 242/199 |
| 4,545,500 | 10/1985 | Yamaguchi et al. | 242/197 X |

Primary Examiner—Donald Watkins
Attorney, Agent, or Firm—Birch, Stewart, Kolasch & Birch

[57] ABSTRACT

In a tape cartridge having a magnetic shielding plate, there are provided one or more supporting or receiving ribs for supporting one or more portions of the rear face of the magnetic shielding plate, preferably at the left and right portions thereof, and one or more guide ribs corresponding to but away from the supporting ribs a distance slightly greater than the thickness of the magnetic shielding plate, such that the shielding plate can be inserted into the gap between the one or more supporting ribs and the one or more guide ribs. Moreover, there is provided one or more pressing ribs having a vertical straight wall at a root portion of the rear face of the guide ribs so that the magnetic shielding plate is pressedly inserted between the straight wall of the pressing ribs and the supporting ribs for securing the magnetic shielding plate.

2 Claims, 4 Drawing Sheets

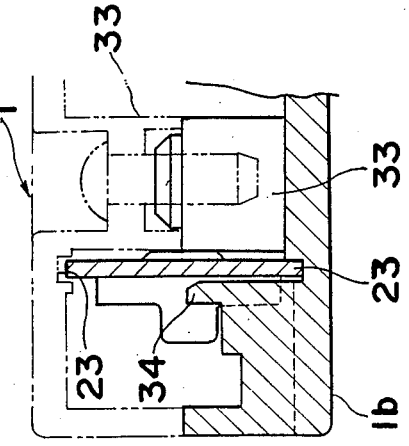
Fig. 2 (Prior Art)
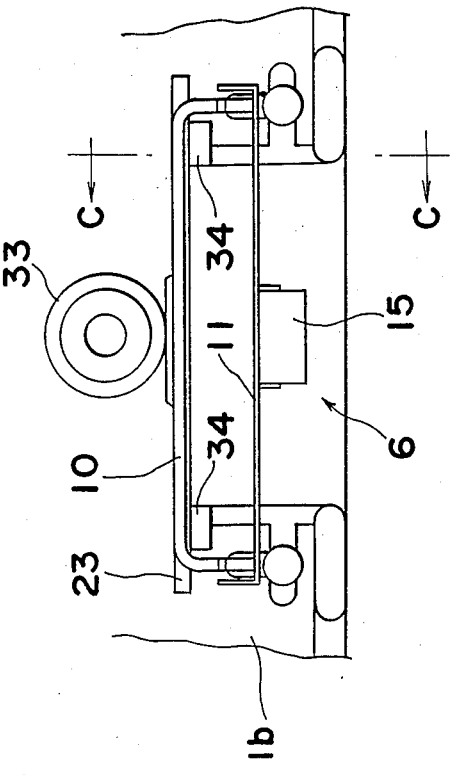
Fig. 1 (Prior Art)
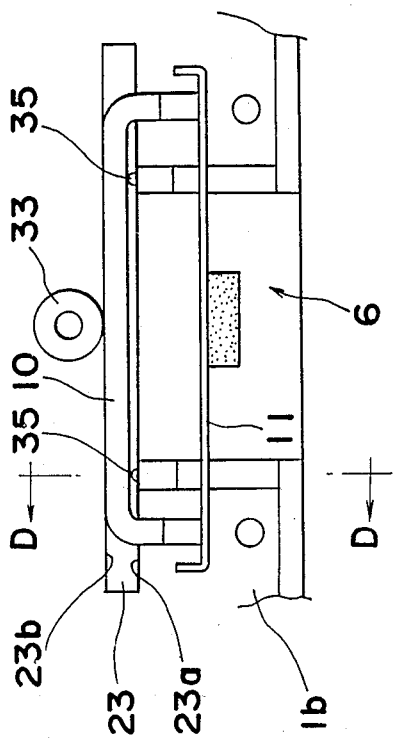
Fig. 4 (Prior Art)
Fig. 3 (Prior Art)

TAPE CARTRIDGE WITH AN ARRANGEMENT OF A MAGNETIC SHIELDING PLATE

BACKGROUND OF THE INVENTION

1. Field of the Invention

The present invention relates to a tape cartridge, and more particularly to a tape cartridge comprising a magnetic shielding plate disposed at the inner part of a head insertion window defined at a front face of the cartridge.

2. Description of the Prior Art

An example of a conventional magnetic shielding plate is shown in FIG. 1 and FIG. 2, wherein a head insertion window 6 is defined on a front wall of a case body 1 which is formed by a top half 1a and bottom half 1b and a magnetic shielding plate 10 is situated inside the head insertion window 6 standing in a vertical attitude. The magnetic shielding plate 10 is inserted in a gap between a rib 34 and bosses 33 (only one is shown in FIG. 1) projected from the inner surface of the top half 1a and bottom half 1b, with respective top and bottom edges fitted in slots 23 defined in the respective inner surfaces of the top and bottom halves 1a and 1b. Also, a pad supporting spring 11 having a pad 15 is supported in front of the magnetic shielding plate 10.

In order to facilitate insertion of the magnetic shielding plate 10 in the slots 23 and the gap between the ribs 34 and the bosses 33, the widths of the slot and the gap are defined slightly greater than the thickness of the magnetic shielding plate 10. Therefore, in the process of assembling the top half 1a on the bottom half 1b after mounting of the magnetic shielding plate 10 in the bottom half 1b, the magnetic shielding plate 10 rattles in the bottom half 1b and the rattling causes the pad supporting spring 11 to be displaced. In addition, since there is such a condition that the magnetic shielding plate 10 rattles between the top and bottom halves 1a and 1b after assembling of them is completed, when the tape cartridge is mounted in a cassette radio or car stereo, the magnetic shielding plate rattles due to the vibration of a tapedeck of the cassette radio or car stereo and rattling of the magnetic shielding plate 10 in the case body 1 causes the case body to be vibrate slightly, resulting in a bad effect of on the tape running characteristic.

In order to eliminate the problem of the rattling of the magnetic shielding plate 10, there has been proposed to provide a supporting member, as shown in FIGS. 3 and 4 as disclosed in the Japanese Utility Model laid open No. 52-77730. The proposed arrangement is such that there is provided a pair of projections 35 at the left and right portions of the front wall 23a defining the slot 23 of either one of the slots of the top half 1a or bottom half 1b. Each of the projections 35 is so rounded shown at 35a that the projection is expanded toward the mount of the slot 23 so as to secure the magnetic shielding plate 10 by the projections 35, the rear wall 23b of the slot 23 and bosses 33 formed behind the slot 23.

In the arrangement shown in FIGS., 3 and 4, it is still difficult to completely eliminate the rattling of the magnetic shielding plate 10 partly because the slot 23 is rather shallow and partly because the force of the round portions 35a pressing on the magnetic shielding plate 10 is small as the magnetic shielding plate is pressed only by a part of the round portion 35a of the projection 35 formed in the shallow slot. Originally the thickness of the portion of the case body 1 where the slot is formed is thin, about 1 mm, and the depth of the slot 23 formed in the thin portion has to be shallow. Accordingly, even if the projection 35 is formed over the full height of the front wall 23a of the shallow slot 23, the size of the projections 35 has to be insufficient to support the magnetic shielding plate 10 having a 10 mm height which is several times the height of the projections. In addition, the projection is formed in the round shape, as shown at 35a, which can not function to fully press the magnetic shielding plate 10. Therefore, the proposed arrangement also has such a problem as mentioned below in the process of assembling of the top half 1a to the bottom half 1b after mounting of the magnetic shielding plate 10 in the bottom half 1b. As mentioned above, it is difficult to secure the magnetic shielding plate 10 stably by only pressing the magnetic shielding plate by the round projections 35a. Moreover, according to the proposed arrangement, the magnetic shielding plate 10 is apt to fall frontward when the case body 1 is subjected to vibration in the assembly line in the manufacturing process, partly because the round portions 35a engage with only the front face of the magnetic shielding plate 10, allowing frontward falling thereof, and partly because the pad supporting spring 11 is easily displaced, therefore there still remains problems to be solved.

SUMMARY OF THE INVENTION

An essential object of the present invention is to provide a tape cartridge in which the work of assembling is easy and tape running characteristic is good.

Another object of the present invention is to provide a tape cartridge which prevents both rattling of the magnetic shielding plate and falling frontward in the process of assembling.

According to the present invention, there are provided one or more supporting ribs for supporting one or more portions of the rear face of the magnetic shielding plate, preferably at the left and right portions thereof, and one or more guide ribs corresponding to and away from the supporting ribs a distance slightly greater than the thickness of the magnetic shielding plate, so that the magnetic shielding plate can be inserted into the gap between the one or more supporting ribs and the one or more guide ribs.

Moreover, there are provided one or more pressing ribs having a vertical straight wall at a root portion of the rear face of the guide ribs so that the magnetic shielding plate is pressedly inserted between the straight wall of the pressing ribs and the supporting ribs for securing the magnetic shielding plate.

By the arrangement of the present invention, the magnetic shielding plate can be guided by the guide ribs into the gap between the supporting ribs and the straight walls of the pressing ribs, whereby the magnetic shielding plate can be secured in position without rattling.

It is an advantage of the present invention that since the magnetic shielding plate is pressed by the straight walls formed at the root of the pressing ribs, the magnetic shielding plate can be pressed with a sufficient force compared to the pressing of the round portion in the conventional arrangement so that the rattling of the magnetic shielding plate can be reliably prevented.

It is a further advantage that since the magnetic shielding plate can be supported without rattling as mentioned above, the magnetic shielding plate can be prevented from falling at the time of the assembling process, the workability of assembling can be improved and the tape running characteristic also can be improved.

It is a further advantage that the magnetic shielding plate is guided into the gap between the pressing ribs whereby and the straight walls by the guide ribs, the magnetic shielding plate can be inserted in the gap easily, so that the assembling work can become easier.

BRIEF EXPLANATION OF THE DRAWINGS

FIG. 1 is a partial top plan view of an example of a conventional tape cartridge, FIG. 2 is is a cross sectional view taken along the lines C—C in FIG. 1, FIG. 3 is a partial plan view of another example of a conventional tape cartridge, FIG. 4 is a cross sectional view taken along the lines D—D in FIG. 3.

DETAILED DESCRIPTION OF THE PREFERRED EMBODIMENT

Figure 5:
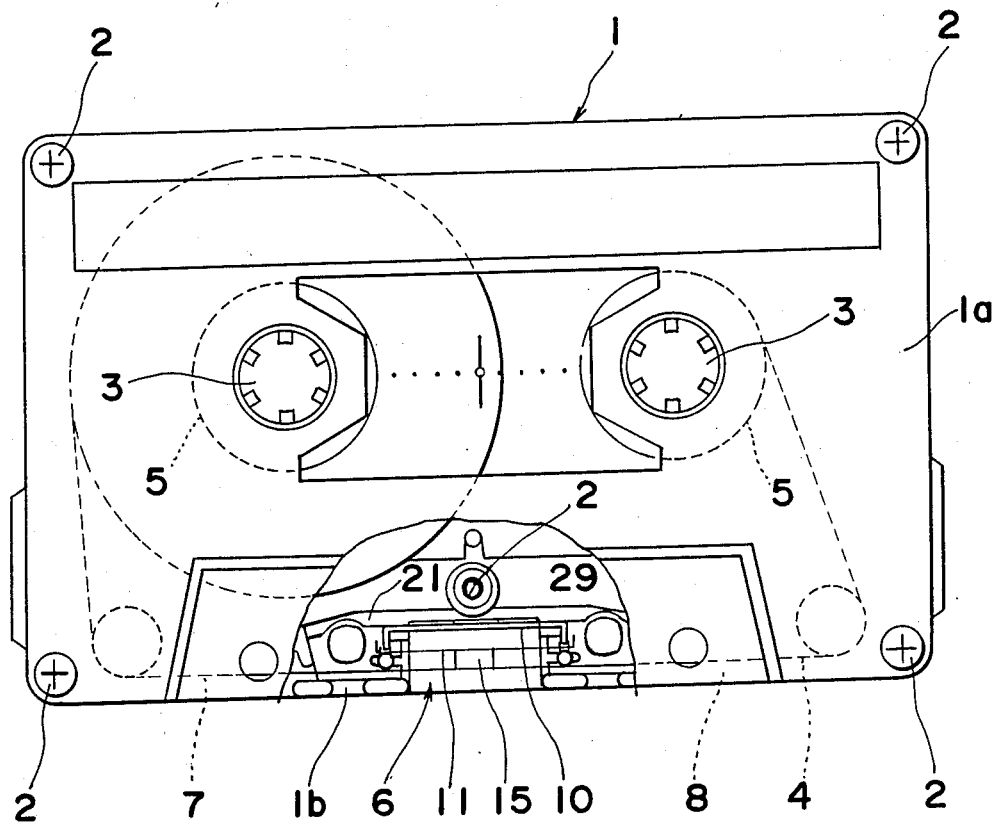
FIG. 5 is a top plan view showing an embodiment of a tape cartridge according to the present invention with a part broken.

Referring to FIG. 5, there is seen a general view of the tape cartridge according to the present invention, wherein the case body 1 is formed by assembling the top half 1a and bottom half 1b. In the embodiment shown, the top half 1a and bottom half 1b are connected by tapping screws 2 at five positions including the four corners and the central portion of the case body 1. Drive shaft insertion openings 3 are defined at the left hand and right hand and on the central portion in terms of the front and rear directions of the case body 1. A pair of hubs 5 for winding a recording tape 4 are rotatably mounted in the case body 1 so that both of the hubs 5 are respectively positioned on the drive shaft insertion openings 3. A head insertion window 6 is opened at the central portion of the front face of the case body 1 and an erasing head insertion window 7 and a pinch roller insertion window 8 are defined on the alternate positions on both sides of the head insertion window 6 in the front face of the case body 1 in a symmetrical manner so that when the top and bottom of the case body is reversed, the positions of the erasing head insertion window 7 and pinch roller insertion window 8 are changed. The recording tape 4 is released from one hub 5 and drawn out of the case body 1 and taken up by another hub 5 passed through the respective windows 7, 6 and 8.

Figure 6:
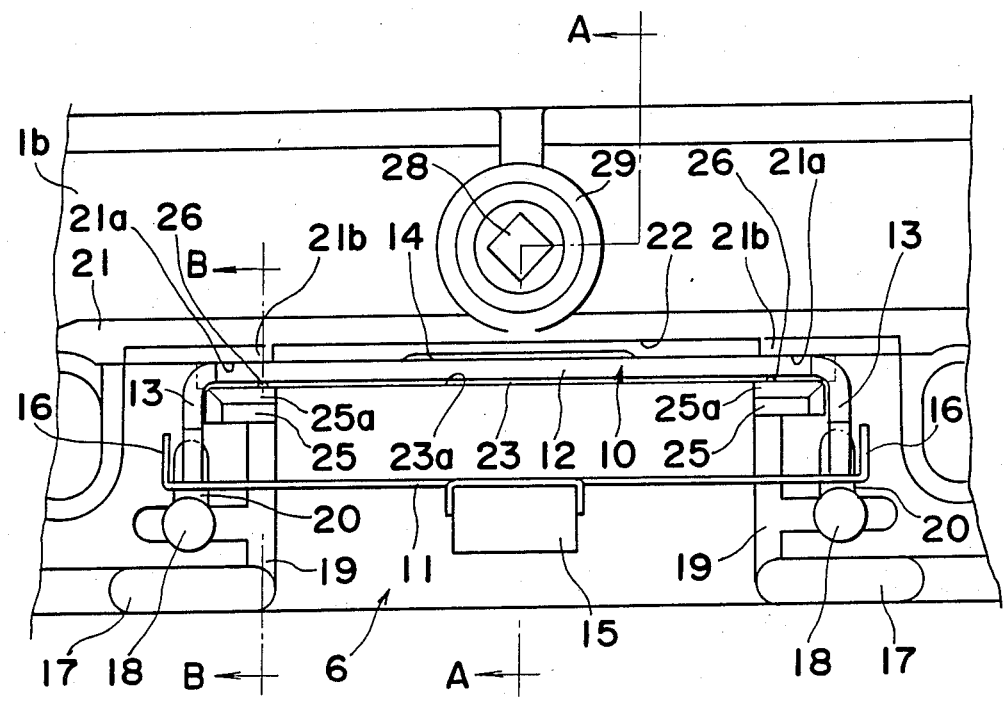
FIG. 6 is a partial plan view of an embodiment of the tape cartridge according to the present invention.
Figure 7:
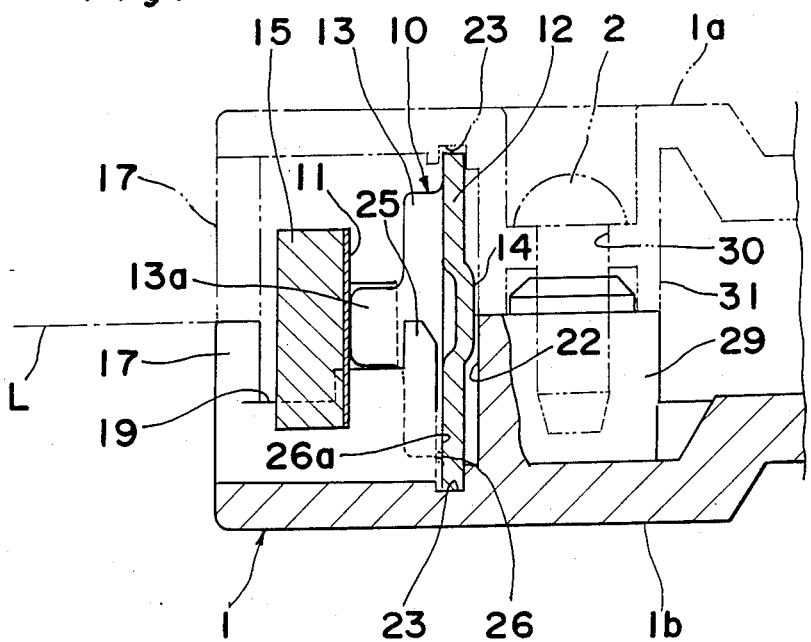
FIG. 7 is a cross sectional view taken along the lines A—A in FIG. 6.

FIG. 6 shows the inner part of the head insertion window 6 wherein the magnetic shielding plate 10 and the pad supporting spring 11 for supporting the pad 15 are assembled, as shown.

Figure 8:
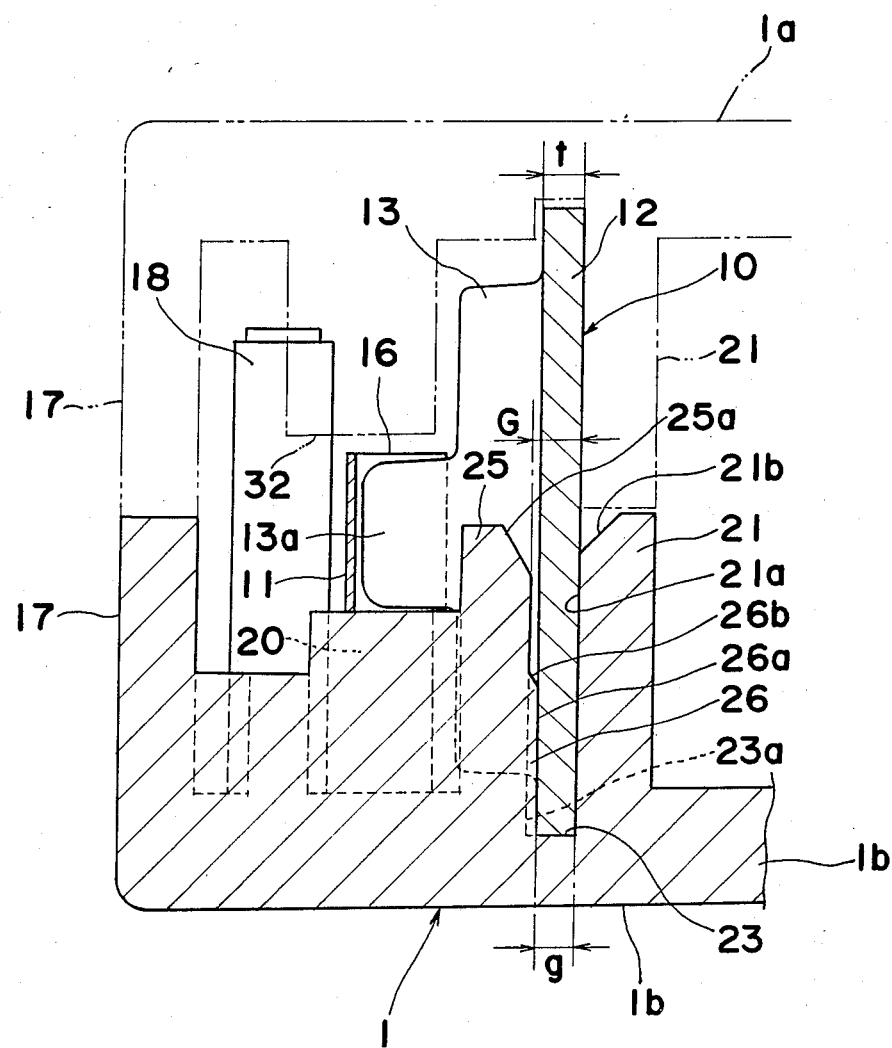
FIG. 8 is a cross sectional view taken along the lines B—B in FIG. 6.

The magnetic shielding plate 10 is made of a generally flat main plate 12 and end plates 13 formed by being bent at both ends of the main plate 12 frontward and perpendicular to the main plate. A projected portion 14 is centrally formed toward the rear face of the main plate so as to reinforce the main plate. The end plates 13 have their upper and lower portions cut to form narrow portions 13a, as shown in FIG. 8.

The pad supporting spring 11 is made of platinum or phosphor bronze, the pad 15 is secured at the central portion thereof and end plates 16 are projected perpendicular in a backward direction.

Each pair of front teeth 17 are vertically projected from the inner surface of the top half 1a and bottom half 1b on both sides of the head insertion window 6 so that the top face of the respective front teeth of the bottom half 1b abuts to the bottom face of the front teeth of the top half 1a. Tape guide pins 18 are projected from the inner surface of the bottom half 1b at the respective positions of inside of the front teeth 17 so as to define a tape running path between the front teeth 17 and guide pins 18. The tape guide pins 18 are higher than the level L at which the top half 1a and bottom half 1b are engaged so that the top end of the tape guide pin 18 reaches the inner surface of the top wall of the top half 1a. Tape height regulating ribs 19 are formed on the inner surface of the bottom wall of the bottom half 1b so as to extend from the front teeth 17 toward the inside of the case body 1 for regulating the level of the recording tape 4. From the root portion of the tape guide pins 18, spring receiving ribs 20 are formed toward the inside of the case body 1. The spring receiving ribs 20 are disposed outside the tape height regulating ribs 19 and are higher than the tape height regulating ribs 19. A partition wall 21 vertically stands from the inner surface of the bottom half 1b in an area inside of the head insertion window 6 so as to separate the tape accommodating chamber and head accommodating chamber. The same partition wall 21 is provided on the top half 1a so that when the top half 1a and bottom half 1b are combined, both of the partition walls 21 are abutted together. In the front portion of the partition walls 21, a recess 22 is formed corresponding to both side ends of the head insertion window 6 and receiving ribs 21a are formed for receiving the magnetic shielding plate 10. Slanted surfaces 21b are formed on the top edge portion of the receiving ribs 21a so as to guide the insertion of the magnetic shielding plate 10. Recesses 23 are opposedly defined near the root portion of the front of the partition wall 21 on the respective top half 1a and bottom half 1b, with a width larger than the thickness of the magnetic shielding plate 10.

A pair of guide ribs 25 are formed on the inner surface of the bottom half 1b in parallel with the partition wall 21 on both sides of the slot 23. The guide ribs 25 stand at the height of the butting level L of the top half 1a and bottom half 1b. The guide ribs 25 are disposed at a position corresponding to the position opposing the front face of the receiving ribs 21a with a gap G thereof to coincide with the width of the slot 23, slightly larger than the thickness of the main plate of the magnetic shielding plate 10. The guide ribs 25 are shown connected to the inner end of the tape height regulating ribs 19 and the top ends of the guide ribs 25 are tapered at 25a.

A pressing rib 26 having a straight wall 26a is formed at the root portion of the rear surface of the guide rib 25 to which the receiving ribs 21a oppose. The gap G between the straight wall 26a of the pressing rib 26 and the receiving ribs 21a is slightly smaller than the thickness t of the main plate 12 of the magnetic shielding plate 10. In addition, the straight wall 26a is higher than the depth of the slot 23 measured from the inner bottom of the front wall 23a of the slot 23. Specifically, the height of the straight wall 26a is higher than $\frac{1}{4}$ of the height of the the guide ribs 25 and receiving ribs 21a and higher than ⅓ of the height of the magnetic shielding plate 10. On the top of the straight wall 26a of the pressing rib 26, guide slanting wall 26b is formed with a slanting angle sharper than the angle of the guide taper 25a of the guide ribs 25.

The following description is made to explain the way of assembling the magnetic shielding plate 10 and pad supporting spring 11.

Firstly, the magnetic shielding plate 10 is dropped in the bottom half 1b from above and secured in position. For this purpose, the magnetic shielding plate 10 is inserted in the gap between the guide ribs 25 and receiving ribs 21a. In this process, since each of the guide ribs 25 has a height similar to the height of the butting level of the top half 1a and bottom half 1b or the height of the receiving ribs 21a, it is possible to drop the magnetic shielding plate 10 in position between the ribs 21a and 25 from a high position through the guide ribs 25 easily. Moreover, since there is provided the recess 22 between two ribs 21a for supporting only both side end portions of the back surface of the magnetic shielding plate 10, the insertion of the magnetic shielding plate 10 can be readily made even if the magnetic shielding plate 10 is slightly deformed by torsion or bending. In case the main plate 12 is provided with the projection 14, since the projection 14 is accommodated in the recess 22 of the partition wall 21, engagement of the projection 14 with the partition wall 21 can be prevented.

By the dropping of the magnetic shielding plate 10 as mentioned above, the lower portion of the main plate 12 slides on the slanted surface 26b of the projection 26 and enters between the straight wall 26a and ribs 21a. Then by pushing the magnetic shielding plate 10 downward from the top edge thereof, the magnetic shielding plate 10 can be securely fitted in the gap between the straight walls 26a and the ribs 21a without rattling. In this case, the guide ribs 25 engage with the corners of the bent portions 13 of the magnetic shielding plate 10 so as to prevent the displacement of the magnetic shielding plate 10 in the right and left directions. The narrow portions 13a of the bent portions 13 are positioned on the ribs 20.

Subsequently, the pad supporting spring 11 is mounted on the spring receiving ribs 20 by insertion of both ends of the spring 11 into the gap between the tape guide pins 18 and the free ends of the bent portions 13 of the magnetic shielding plate 10 from above. Thus the spring receiving ribs 20 is supported on the spring. Under this state, displacement of the pad supporting spring 11 toward the inside of the case body can be prevented by the engagement with the bent portions 13 and the bent portions 16 of the pad supporting spring 11 are placed to face outside of the narrow portions 13a of the bent portions 13 of the magnetic shielding plate 10 so as to prevent displacement of the pad supporting spring 11 in the right and left directions.

After the necessary parts including the hubs on which the magnetic recording tape is wound are mounted in the bottom half 1b, the top half 1a is put on the bottom half 1b in position and both halves 1a and 1b are connected by the tapping screws. In the embodiment shown, bosses 29 of the bottom half 1b having holes 28 are fitted in corresponding bosses 31 having screw holes 30 and both halves 1a and 1b are connected at the four corners and the central position. In the assembled condition, the top edge of the main plate 12 of the magnetic shielding plate 10 is engaged in the slot 23 of the top half 1a and the magnetic shielding plate 10 can be finally secured. In addition, as shown in FIG. 3, the spring receiving ribs 32 suspended from the top half 1a are situated on the ribs 20 of the bottom half 1b so as to prevent the vertical movement of the spring receiving ribs 20.

In the embodiment described above, although the guide ribs 25 and the pressing ribs 26 are provided only on the bottom half 1b, the same ribs 25 and 26 may be provided on the top half 1a.

Moreover, although the receiving ribs 21a are formed on the partition walls 21 integrally, the ribs 21a may be formed as separate members. In this case, it may be possible to form the receiving ribs in such a manner that one of the ribs 21a engages with the back of the main plate 12 of the magnetic shielding plate 10. It is not essential that the ribs 21a oppose the guide rib 25 correctly. Also, it is not essential to provide the recess 23 between the receiving ribs 21a and the guide ribs 25 in the inner surface of the top half 1a and bottom half 1b. Moreover, the main plate of the magnetic shielding plate 10 may be a flat plate the projection 14.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A tape cartridge comprising a case body having a head insertion window defined on a front wall of the case body, a magnetic shielding plate disposed inside the head insertion window and standing vertically in the case body, at least one first rib (21a) disposed inside the case body for supporting the back of the magnetic shielding plate, at least one second rib (25) disposed at the front of said at least one first rib (21a), separated from said at least one first rib by a gap greater than the thickness of the magnetic shielding plate, and a vertical straight wall (26a) disposed at the root portion of said at least one second rib on the side opposing said magnetic shielding plate for supporting said magnetic shielding plate, whereby said magnetic shielding plate can be inserted in a pressed manner and secured in the gap between said at least one first rib and said at least one second rib by said straight wall.

2. The tape cartridge according to claim 1, wherein two first ribs are disposed corresponding to each respective end portion of said magnetic shielding plate for supporting said respective ends of said magnetic shielding plate from the back, and two second ribs disposed on the front side of said magnetic sheilding plate so as to oppose said respective first ribs.

* * * * *